(12) United States Patent
Chang et al.

(10) Patent No.: US 8,492,640 B2
(45) Date of Patent: Jul. 23, 2013

(54) INTERACTIVE SOUND-AND-LIGHT ART DEVICE WITH WIRELESS TRANSMISSION AND SENSING FUNCTIONS

(75) Inventors: Chih-Yung Chang, New Taipei (TW); Kuei-Ping Shih, New Taipei (TW); Su-Chu Hsu, Taipei (TW)

(73) Assignee: Tamkang University, New Taipei (TW)

( * ) Notice: Subject to any disclaimer, the term of this patent is extended or adjusted under 35 U.S.C. 154(b) by 6 days.

(21) Appl. No.: 13/222,340

(22) Filed: Aug. 31, 2011

(65) Prior Publication Data

US 2012/0227570 A1      Sep. 13, 2012

(30) Foreign Application Priority Data

Mar. 8, 2011   (TW) .............................. 100107708 A (51) Int. Cl.
  *G10H 3/00*   (2006.01)
(52) U.S. Cl.
  USPC ................... 84/723; 84/724; 84/725; 84/730; 84/735
(58) Field of Classification Search
  None
  See application file for complete search history.

(56) References Cited

U.S. PATENT DOCUMENTS

| | | | | |
|---|---|---|---|---|
| 5,017,770 A * | 5/1991 | Sigalov | | 250/221 |
| 5,414,256 A * | 5/1995 | Gurner et al. | | 250/221 |
| 5,442,168 A * | 8/1995 | Gurner et al. | | 463/36 |
| 7,402,743 B2 * | 7/2008 | Clark et al. | | 84/615 |
| 7,459,623 B2 * | 12/2008 | Robertson | | 84/464 R |
| 7,551,161 B2 * | 6/2009 | Mann et al. | | 345/156 |
| 7,858,870 B2 * | 12/2010 | Riopelle | | 84/622 |
| 7,868,238 B2 * | 1/2011 | Sugimoto et al. | | 84/600 |
| 2002/0124712 A1 * | 9/2002 | Osuga | | 84/454 |
| 2002/0170413 A1 * | 11/2002 | Nishitani et al. | | 84/600 |
| 2005/0098021 A1 * | 5/2005 | Hofmeister et al. | | 84/453 |
| 2005/0241466 A1 * | 11/2005 | Riopelle | | 84/725 |
| 2007/0256546 A1 * | 11/2007 | Hikino et al. | | 84/615 |
| 2009/0223345 A1 * | 9/2009 | Mann | | 84/384 |
| 2009/0249945 A1 * | 10/2009 | Yamashita et al. | | 84/612 |
| 2012/0227570 A1 * | 9/2012 | Chang et al. | | 84/464 R |

* cited by examiner

*Primary Examiner* — Marlon Fletcher
(74) *Attorney, Agent, or Firm* — WPAT, PC; Justin King (57) ABSTRACT

The present invention relates to an interactive sound-and-light art device with wireless transmission and sensing functions, which is primarily composed of a plurality of acoustic sensor nodes in artistic shapes, whereas each of the plural acoustic sensor nodes is designed to interact with people through the detection of multi-track music playing or voice-based exhibition of twitter conversations. Substantially, each acoustic sensor node is an artistically-shaped frame having a plurality of sensors embedded therein, which includes sensors for detecting environmental information, and sensors for detection human motion. Moreover, each artistically-shaped frame can further be embedded with interactive components, using which each acoustic sensor node is able to interact with people through multi-track music playing or exhibition of LED light variations, according to the detection of its environment sensors and human motion sensors.

6 Claims, 8 Drawing Sheets

INTERACTIVE SOUND-AND-LIGHT ART DEVICE WITH WIRELESS TRANSMISSION AND SENSING FUNCTIONS

FIELD OF THE INVENTION

The present invention relates to an interactive sound-and-light device with wireless transmission and sensing functions.

BACKGROUND OF THE INVENTION

Nowadays, the applications of wireless sensor network (WSN) are becoming more and more popular in our everyday lives. One exemplary example is the Wii home video game console that is released by Nintendo. A distinguishing feature of the console is its wireless controller, the Wii Remote, which uses an infrared sensor and a 3-axis accelerometer for detecting human motions in three dimensions while transmitting the result of the detection to the Wii console to be processed. Another popular WSN application is a smart physiological status monitoring system, which can be used for monitoring the physiological status of a patient or a senior citizen and updating the same over the Internet in a wireless manner. Moreover, such WSN applications are generally being integrated with certain automatic control systems in respectively so as to construct a smart system for the benefit of our every lives.

In those WSN applications, there are various sensors being used mainly for collecting data in a passive manner so as to be processed later. However, there is rarely any WSN application that is designed with human-machine interactive ability, which is especially true in the field of artistic creation as there is hardly any art work that is able to interact with people.

SUMMARY OF THE INVENTION

In view of the disadvantages of prior art, the present invention is aiming to explore the possibility of interaction between human and a WSN. Moreover, in addition to the interaction between human and a WSN, the present invention also is aiming for providing an integrate product of art and technology that can be used for enhancing the joy of living.

The WSN technology explored in the present invention is a WSN-based platform that is capable of performing a detection to its ambient environment using a variety of sensors while enabling various exhibitions through different output apparatuses for expressing a specific intention according to the result of the detection. Moreover, the platform is configured with a variety of interactive mode so as to be used for creating an environment that is capable of human interaction.

The object of the present invention is to provide an interactive sound-and-light art device, being a platform primarily composed of a plurality of acoustic sensor nodes in artistic shapes, whereas each of the plural acoustic sensor nodes is designed to interact with people through the detection of multi-track music playing or voice-based exhibition of twitter conversations, and substantially, each acoustic sensor node is an artistically-shaped frame having a plurality of sensors embedded therein, which includes sensors for detecting environmental information, such as temperature sensors, humidity sensors, ambient light sensors, wind sensors, etc., and sensors for detection human motions, such as 3-axis accelerometers and microwave sensors. Moreover, each artistically-shaped frame can further be embedded with interactive components, such as music controllers, speakers or light-emitting devices (LEDs), etc., by those each acoustic sensor node is able to interact with people through multi-track music playing or exhibition of LED light variations, according to the detection of its environment sensors and human motion sensors. With the aforesaid interactive sound-and-light art device provided in the present invention, it is expected to create a creative space of smart and interactive environment for the enjoyment of people like us.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 4 (4A and 4B) is a flow chart depicting the steps performed in an interactive sound-and-light art device situated in the human-environment interaction mode.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

The following description relates to the hardware architecture and software architecture used in the present invention.

In view of the hardware architecture, the sensing module used in the present invention is substantially an Octopus II sensor, which is a wireless sensor node developed by the research group in National Tsing Hua University, Taiwan, and being primarily composed of a communication component and a sensing component, is a device compatible to the Tmote Sky node released by Moteiv. Thus, it is designed to operate under TinyOS operation system and using nesC programming language. Generally, an Octopus sensor can be divided into five parts, which are a sensor module, a data and control module, a communication module, a power module and an USB host chip.

Moreover, the DSP chip used in the music module is the VS1000d chip by VLSL, which integrates a low-power DSP core of VSDSP4, and being operating at 12 MHz working frequency and capable of supporting the ogg musical format, is a device configured with 256 Mbytes NAND, Full speed USB, six GPIOs, one SPI interface, one UART and high-quality stereo-sound DAC. It is noted that in a third-generation sensor node, the operation of audio decoding/playing is no longer embedded in the Octopus II sensor, and thus is independently executed by the VS1000d while allowing the Octopus II sensor to only perform the following operations: controlling the core, the expansion of other sensors, controlling a data detection operation, issuing a command for controlling the VS1000d, and controlling a communication operation, and so forth.

In view of the software architecture, it is aiming for design a software architecture for the corresponding WSN to achieve maximum performance, since there is only limited resources available for the wireless sensors used in the WSN as the wireless sensors are preferred to be designed with small size and low power consumption. Comparing with the operation system for the conventional embedded apparatuses, the operation system for wireless sensor is not required to be featured by high performance or high expandability, but should surely have good resource efficiency, as the TinyOS operation system for wireless sensors that is developed by University of California, Berkeley. Operationally, the TinyOS operation system will divide a program into several independent components while enabling those independent components to be interconnected with one another, and allowing the repeated components to be recovered so as to maximizing its performance using minimum resource.

In addition, as the wireless sensors are generally miniature in size, it is difficult to have sufficient memory units embedded therein so that the stack of those memory units will not be sufficiency enough for supporting the performing of those comparatively complicated tasks. Nevertheless, even when there are sufficient memory units, the processor of the wireless sensor will not be powerful enough for the task. Comparing with those conventional operation systems, the TinyOS operation system did not require to have complex memory management function and complex scheduling function as well. In addition, there is no so-called applications programmed in the wireless sensors. Hence, for the operation system adapted for wireless sensors, it is not required to be configured with additional interface that is specifically designed for programming. Accordingly, the TinyOS operation system programs all its functions independently in a Split-phase Interface manner while repeating the usage of as many codes as possible for saving as many memory space as possible. In conventional operation system, a Busy Waiting mode is enabled for the waiting period before the corresponding hardware in a wireless sensor can respond. However, such Busy Waiting mode can cause considerable amount of waste in time and power. Thus, an Event-driven concept is used in the TinyOS operation system, by that an interrupt inquiry is issued first after the corresponding hardware in the wireless sensor had accomplished what it is asked to do, and then the TinyOS operation system will then proceed with the processing of next event. Thereby, the hardware of the wireless sensor can operate smoothly with its embedded programs with minimized resource usage.

Since conventional programming languages can not satisfy the objective of achieving maximum performance with minimum resource usage, a new programming language, i.e. nesC, is developed, which is a language similar to C language and is developed specifically for the TinyOS operation system. The nesC, being an event-driven language, is capable of programming different functions into different modules, which each is referred as a component, while allowing each module to be included in the system only when it is being used, so that the system can be minimized. Thus, an operation system utilizing the nesC language is very much suitable for those sensor nodes with limited resources. The coding programmed by the nesC language is addressed as *.nc, and each of those nesC coding, i.e. each *.nc, can either be used for defining an interface or a component. Moreover, any interface defined using nesC language is programmed with two-way communication ability and thus is capable of acting as a two-way communication channel between a provider and a user. Each interface is programmed with an event set and a command set, and also there can be a plurality of functions being defined in one interface for allowing different components in the interface to communication with each other.

The interactive sound-and-light art device with wireless transmission and sensing functions is configured with three operation modes, which are the environment detection mode, the human-environment interaction mode and the voice-based social network conversation mode. In addition, for the voice-based social network conversation, the present invention uses a voice-based twitter conversation for illustration.

In the environment detection mode, an evaluation is made based upon the detection of wind power, rainfall and sunlight condition so as to determine a proper music conforming to the environment. Please refer to FIG. 1, which is a diagram showing a software architecture for an environment detection mode configured in an interactive sound-and-light art device of the present invention.

Figure 1:
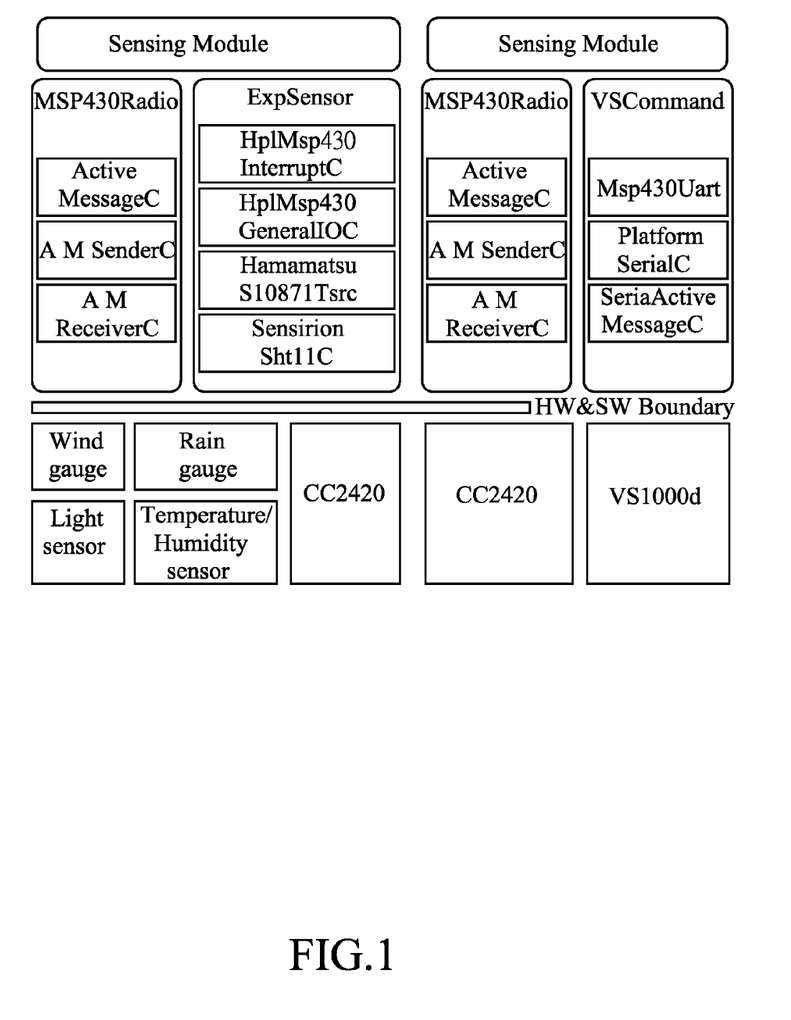
FIG. 1 is a diagram showing a software architecture for an environment detection mode configured in an interactive sound-and-light art device of the present invention.

Under the software architecture shown in FIG. 1, a MSP430Radio component, which is composed of CC2420, is used for wirelessly receiving and transmitting data; an ExpSensor component, which is composed of a wind gauge, a rain gauge, a temperature/humidity sensor, and a light sensor, is used not only for expanding the functionality of sensors, but also for data receiving; a VSCommand component, which is composed of VS1000d, is used for issuing a command to the VS1000d for controlling the same to play a music indicated in the command. Detailed description relating to the operation of the aforementioned components will be provided hereinafter.

As shown in FIG. 1, the ExpSensor in the sensing module is mainly used for expanding the functionality of sensors, in which the HplMsp430InterruotC and the HplMsp430GeneralIPC is in charge of expanding the functionality of the wind gauge and rain gauge, and also used for interrupting the operation of the Octopus II so as to enable a counting operation before acquiring the measurement of current wind speed and rainfall.

In addition, the sensing of temperature and humidity is performed by the SensirionSht11C component, in which an I2C communication protocol is used for exchanging serial data with SHT, and is capable of being divided into two phases, i.e. Command phase and Data phase. Under the Command phase, the SHT 11 must be initiated by Octopus II so as to be informed that an exchanging of detection command is going to be performed, such as a command of 00011 for temperature detection, a command of 00101 for humidity detection. It is noted that the SHT 11 will wait for a period of time after it had received a command, and then it will enter the data phase after the conversion of the detection data. As soon as the SHT 11 enters the data phase, it will transmit a 12 bits detection data in two operations to the Octopus II. The two transmitting operations, i.e. MSB and LSB, is performed in a unit of 8 bits, and each time a unit of data is received by the Octopus II, the Octopus II will issue am ACK response to the DHT 11 for acknowledging the same that the data have been received successfully. By repeating the aforesaid operations, temperature and humidity are detected.

Moreover, the HamamatsuS10870TsrC, being a light sensor, is designed to perform its data detection using the 12 bits ADC of the Octopus II, and also using an AdcReadClientC for controlling an operation of analog-to-digital conversion.

In the music module, the component of MSP430Radio is mainly provided for data transmitting/receiving, packet analysis, buffer writing in and removal, CC2420 driving, and so on, and is also used for transferring an acknowledgement from the sensing module to the music module. In addition, the VSCommand component is composed of Msp430Uart, so that the control program of the VS1000d is processed by the Msp430Uart, whereas the pins of Octopus II that are specified for the Msp430Uart are P3.6 and P3.7, representing respectively the TX and RX of the UART, and the Buat rate is specified to be 115200.

Figure 2:
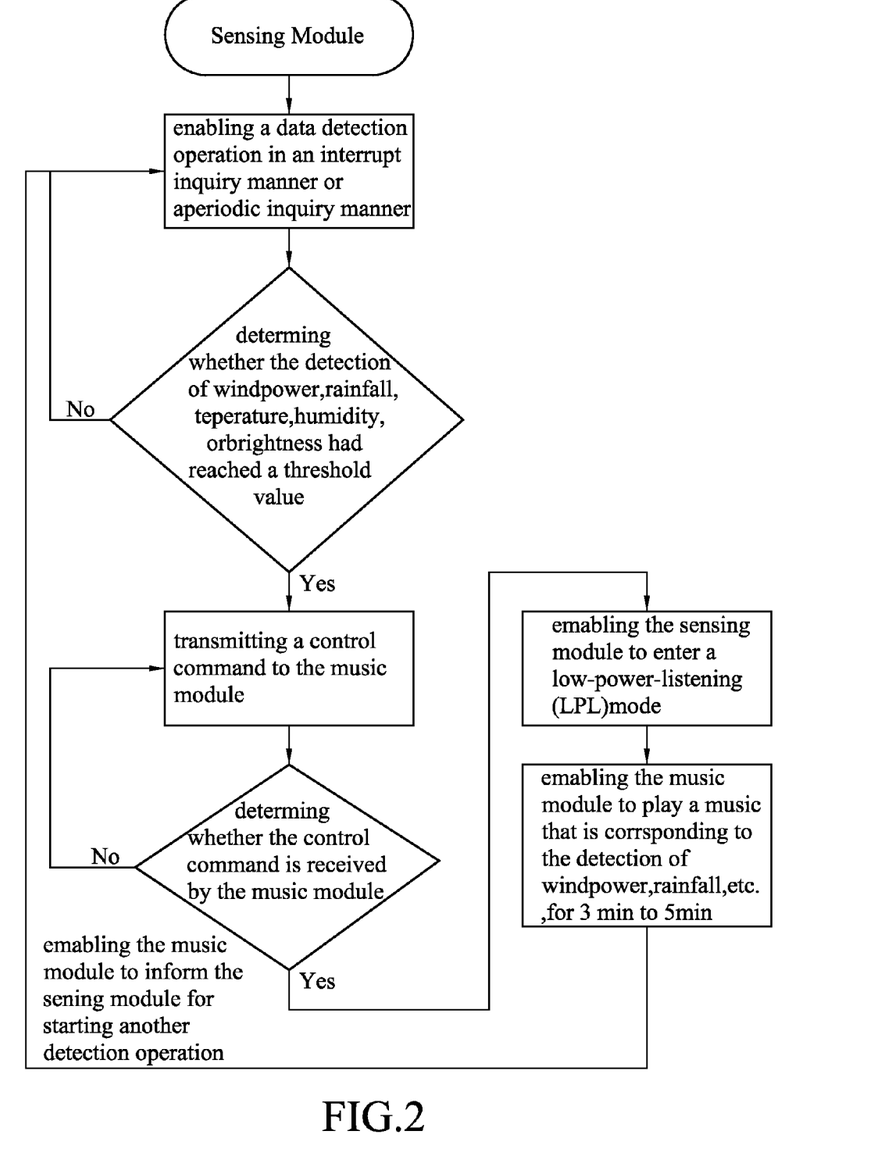
FIG. 2 is a flow chart depicting the steps performed in an interactive sound-and-light art device situated in the environment detection mode.

Using the aforesaid software architecture, the required environment detection mode can be realized, and when the detected wind power and rainfall had reached thresholds, the Octopus II will issue a control command through the CC2420, and as soon as the control command is received by the music module that is formed like a sunflower in this embodiment, the music module will perform a packet analysis operation so as to play a music that is corresponding to the detection of windpower/rainfall for 3 min to 5 min. It is noted that the aforesaid process is detailed in the flowchart shown in FIG. 2.

In the human-environment interaction mode, for realizing the interaction between the music module and any person that is moving neighboring thereto, the means of cluster establishing, time synchronization, and multi-hop transmission are embedded in the music module in addition to that the sensing module is enabled to operation under the aforesaid environment detection mode. Moreover, relating to the use of sensors, a 3-axis accelerometer is used for detecting whether the music module is being tapped or touched in any way, and a microwave sensor is used for detecting whether there is any movement in front of the music module, e.g., whether there is a pedestrian walking through the front of the music module. In addition to the connections between sensors, the operation algorithm should also be able to enforce the procedures of clustering, time synchronization, and multi-hop transmission. It is noted that the time synchronization procedure is used for preventing any delay in the music module in view of anything might cause inconsistent between major melody and minor melody; the procedure of clustering is used for identifying and the nodes distinguishing the major melody from the minor melody; and the procedure of multi-hop transmission is used as a multi-hop transmission mechanism for data packets and control packets.

Figure 3:
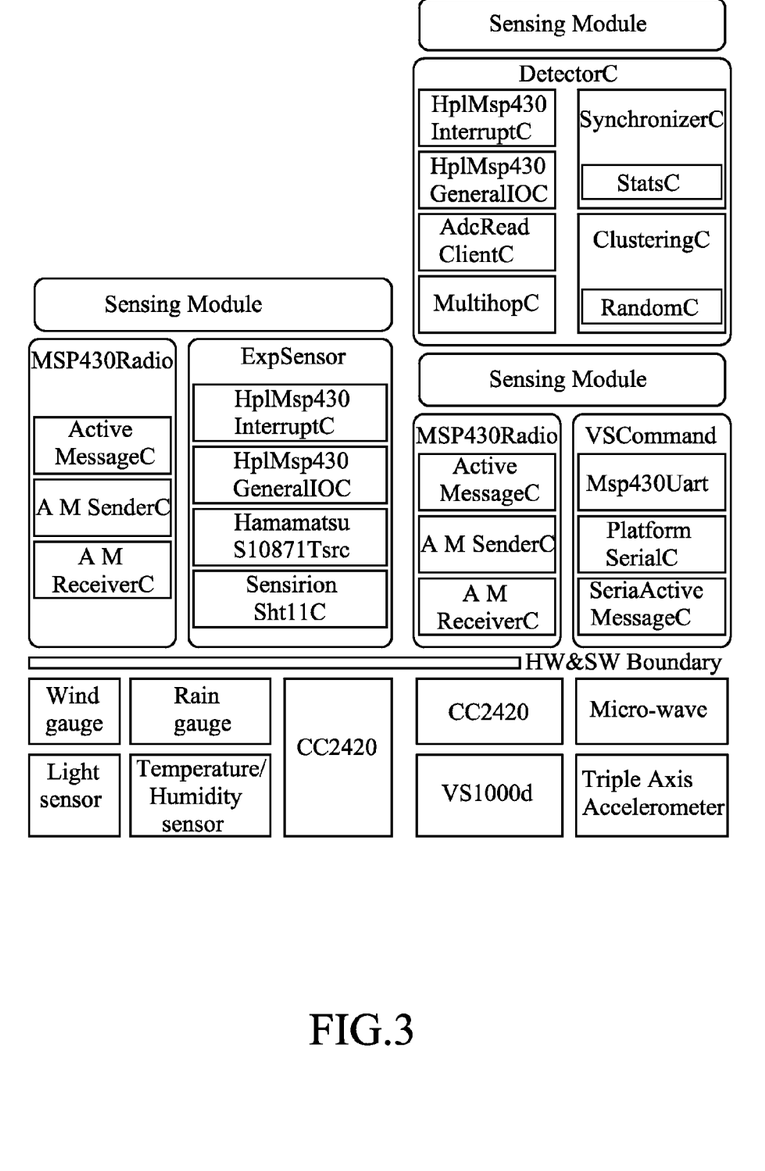
FIG. 3 is a diagram showing a software architecture for an human-environment interaction mode configured in an interactive sound-and-light art device of the present invention.

Please refer to FIG. 3, which is a diagram showing a software architecture for an human-environment interaction mode configured in an interactive sound-and-light art device of the present invention. In FIG. 3, the software architecture is divided into two parts, that are a sensing module and a music module, and the sensing module is used for detecting environment information and the music module is used for playing music according to the result of the environment detection. It is noted that the human-environment interaction is achieved mainly through the operations of dynamical cluster head selection, time synchronization, and multi-hop transmission. Thus, the interactive algorithm in the present invention should be able to trigger a music playing operation under the conditions either when the music module is being tapped or touched in any way, there are movements in front of the music module, e.g., there is a pedestrian walking through the front of the music module; or the wind power or rainfall had achieved a designated threshold value. Operationally, the interactive algorithm is performed by the use of a DetectorC component, which is designed with the abilities of sensor function expansion, time synchronization, cluster establishment, and multi-hop transmission. Similarly, MSP430Radio and VSCommand are also being used for performing data transmission and receiving through CC2420, and issuing commands to VS1000d. Detailed description relating to the functions of the aforesaid components as well as how they are triggered to operation will be provided hereinafter.

Figure 4A:
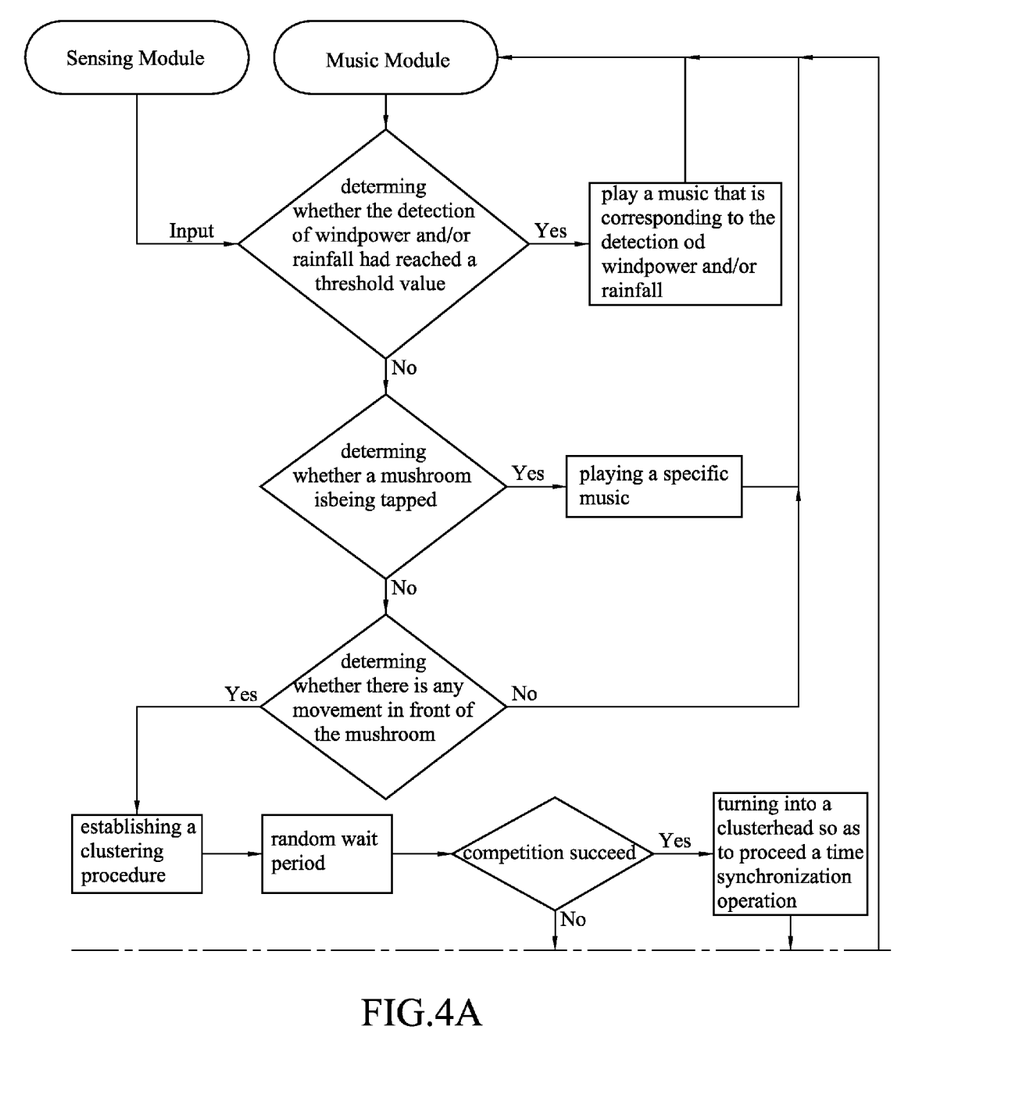
Figure 4B:
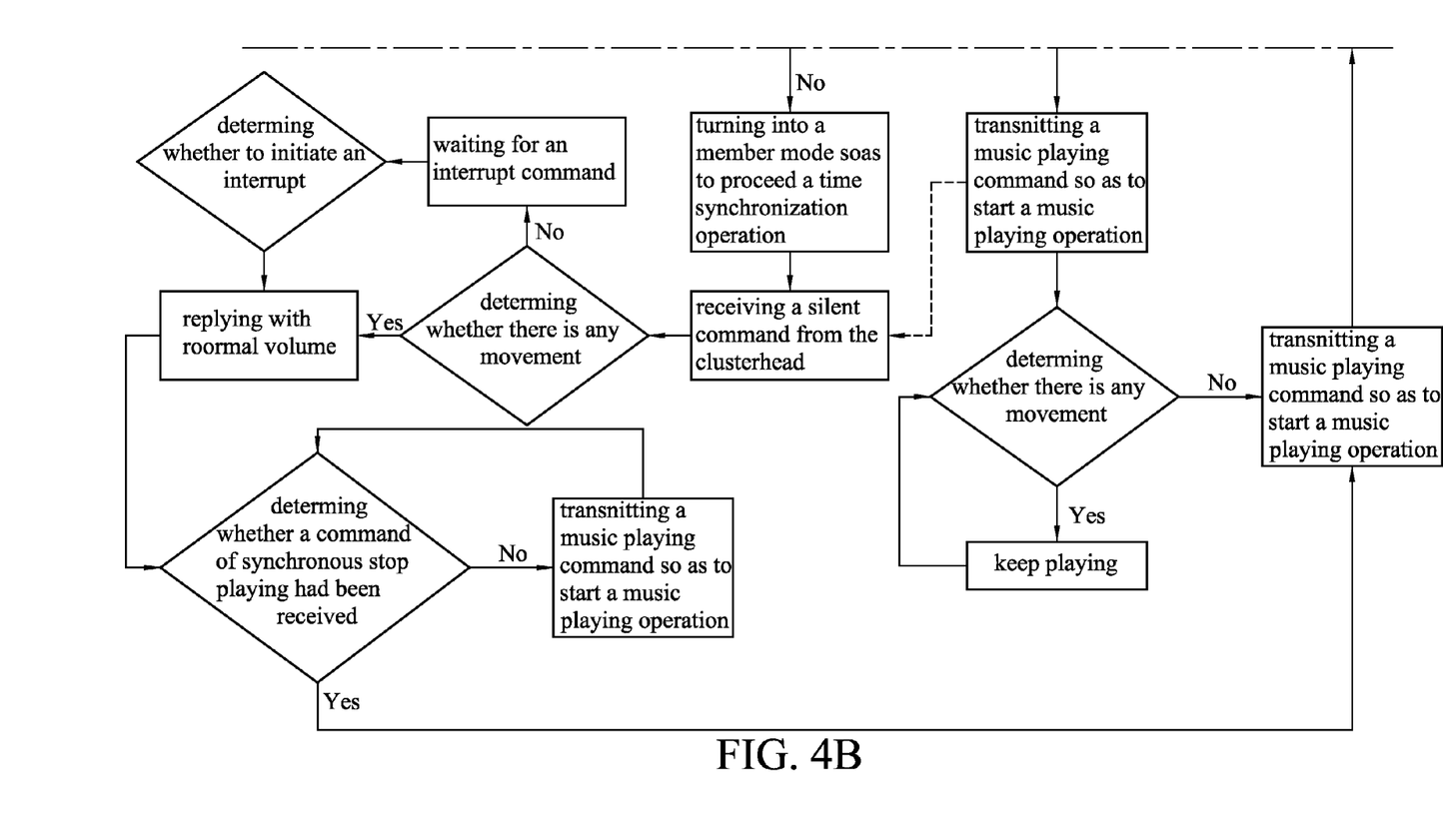

The music module, that is shaped like a sunflower in this embodiment, is designed to be triggered interactively in three ways, that is triggered by environmental influence, triggered by tapping and triggered by movement, that are prioritized in the priority order as specified. In view of the triggering by environmental influence, the music that is currently being played by the music module will be interrupted and recorded instantly in respond to the current environment condition that is detected by the sensing module so as to enable the music module to play other music that is corresponding to the result of the environment detection for a specified period of time, and then after completing the playing of such environmental music, the playing of the original music will be resumed. It is noted that the aforesaid process is detailed in the flowchart shown in FIG. 4, and the environment detection performed by the sensing module is enabled by the ExpSensor component while the transmission of the result of the detection is enabled by the MSP430Radio component.

As soon as the music module receives the detection result from the sensing module, it will first interrupt any process that is being performed currently, while enabling a specific music to be play as indicated by the detection result through the VSCommand component. In view of the triggering by tapping, similarly the music that is currently being played by the music module will be interrupted and recorded instantly in respond to a tapping that is detected by the 3-axis accelerometer in the DetectorC component so as to enable the music module to play other music that is specified by the VSCommand component for a specified period of time, and then after completing the playing of such specified music, the playing of the original music will be resumed.

In view of the triggering by movement, the music playing of the music module is governed by a concept of clustering, that is, if there are a plurality of music module distributed on a square, only one music module is specified to play the major melody while all the others can only play the minor melody when they are triggered by movement. Operationally, when none of the music modules that are connected in a wireless sensing network is triggered, it represents that there is no cluster head currently existed in the network. But, in a condition when for the first time there is a music module in the wireless sensing network that is triggered by movement, a procedure for establishing a cluster will be activated, whereas the cluster establishing procedure is substantially being performed by the use of a ClusteringC component in this embodiment. It is noted that such ClusteringC component is actually a TinyOS-enabled component. In the condition when for the first time there is a music module in the wireless sensing network that is triggered by movement and there is no cluster head existed prior thereto, the triggered music module will first use a RabdomC component to generate a random number for specifying a random period of waiting time to the sensing module, and thereafter, if no cluster head packet being issued from other music modules that is received by the sensing module during such waiting time, the triggered music module is then being specified to be a cluster head and thus issuing a cluster head packet to inform other music modules on the network. Thereafter, after all the other music modules had reply respectively an ACK to the triggered music module, such triggered music module is officially being acknowledged to be the cluster head of the network and is specified to be the only one music module for playing the major melody while issuing a packet for enabling all the other music modules on the network to synchronously play the minor melody in a silent mode.

For preventing any delay in the music playing, as soon as the cluster head is being specified, the cluster head should initiate a time synchronization operation upon all the other music module on the network. It is noted that such time synchronization operation is substantially performed by the use of a SynchronizerC component, in which first a StatsC is used for performing a minimum square linear programming operation so as to obtain a time difference between the cluster head and other member nodes, and then, based upon the timing of a command for playing the major melody that is issued by the cluster head, the cluster head also issue packet synchronously to other music modules on the network for controlling those to synchronously play the minor melody in a silent mode. It is noted that any one of those other music modules on the network that are playing the minor melody in a silent mode is released from the silent mode so as to play the minor melody normally only when it is being triggered by movement. Consequently, the music module that is not the cluster head and is being triggered by movement can play the minor melody seamlessly conforming to the major melody. It is noted that the aforesaid process is detailed in the flowchart shown in FIG. 4.

For the voice-based twitter conversation mode, it is primarily performed under the principle of keyword inquiry, that is most popular in Taiwan. Operationally, the scripts acquired from a social network by keyword searching are converted into speeches that are to be registered in the music module, and when the music module detected that there is a pedestrian walking through the front of the same, the music module will randomly select and play several speeches to the pedestrian. However, in this embodiment, when the amount of people in the square is larger than a predefined threshold value, that is 3 in this embodiment, all the music module in the network will be triggered to randomly select and play several speeches obtained from the social network by keyword searching simultaneously. Operationally, the aforesaid process is proceeded in two sections, one of which is performed in a rear system where a searching on a social network based upon keyword is performed while converting the corresponding scripts into speeches and transmitting the speeches to the music modules, and another section is the performing of a voice-based social network conversation algorithm in the wireless sensors.

Figure 5:
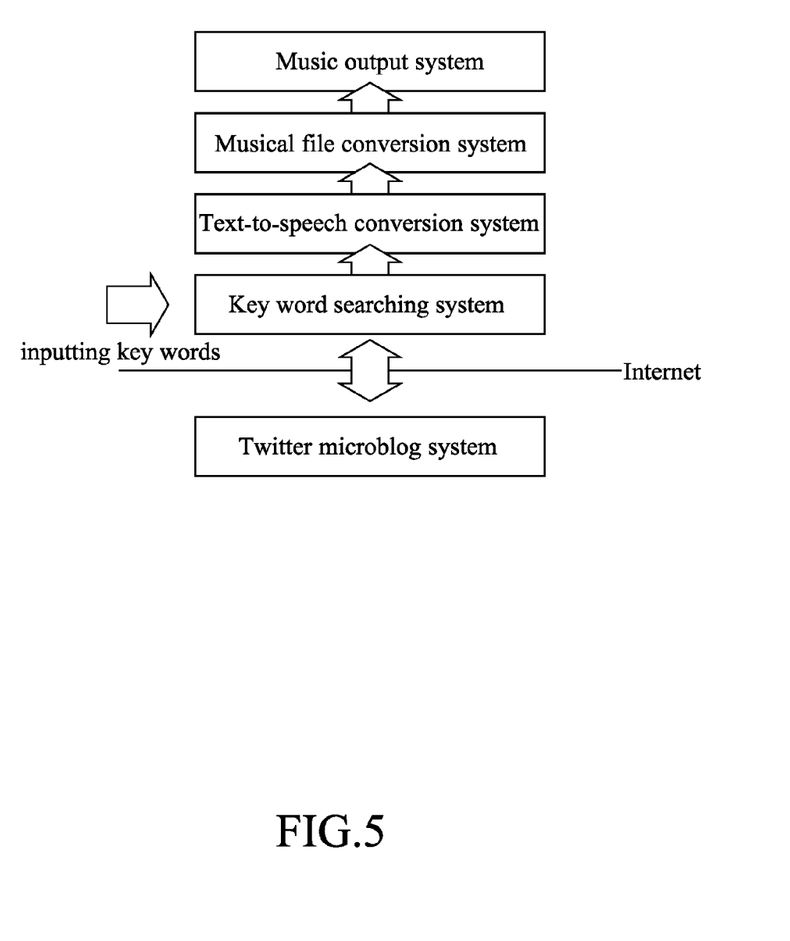
FIG. 5 is a schematic diagram showing the architecture of a voice-based social network conversation, whereas the voice-based social network conversation is substantially a voice-based twitter conversation.

Please refer to FIG. 5, which is a schematic diagram showing the architecture of a voice-based social network conversation, whereas the voice-based social network conversation is substantially a voice-based twitter conversation. As shown in FIG. 5, the rear system will performed a search in Twitter micro blog system through Internet according to the keywords that are inputted by a user, whereas the searching is enabled through the function library of Twitter, and is operable using Twitter API. Thereafter, the result of the search will be feedback to the rear system where it is filtered and then converted into speeches using TTS text-to-speech conversion system. It is noted that the text-to-speech conversion system used in the present invention is not only designed for converting English texts, but also is capable of converting Chinese texts. However, the speeches obtained from the TTS text-to-speech conversion system can not be played directly from the music module as their formats are required to be converted by the use of a file conversion system first, and then to be send to a music output system so as to be transmit to the music modules. Ideally, the speeches are broadcast just like a digital sound obtained from a conversation in remote end through network, but not a recording of human voice. Thus, the tone of the speeches will not be processed to mimic human voice.

Basically, the voice-based social network conversation mode adopts the centralized localization algorithm, by that all the node in the wireless sensing network are divided into the types of nodes, one of which is the common node, while the another is the header node. When a wireless sensing network is first being established, a node is selected in advance to be the header node while allowing all the other nodes to be the common nodes. The header node is the node not only in charge of the computation of the statistic of all the data while governing all the operations relating to the speech broadcasting, but also are designed to work as a common node. On the other hand, in addition to the receiving of speech broadcasting command from the header node, each common node is designed with a data detection and feedback abilities. Operationally, any common node in the wireless sensing network will report a detection data to the header node when it detects the presence of human, and the header node will include all the detection data from the other common nodes into a statistic computation for determining whether the resulting static value is larger then a predefined threshold; and if so, the header node will be enabled to issue a command for enabling all the nodes in the wireless sensing network to play the speeches for about 10 seconds.

Figure 6:
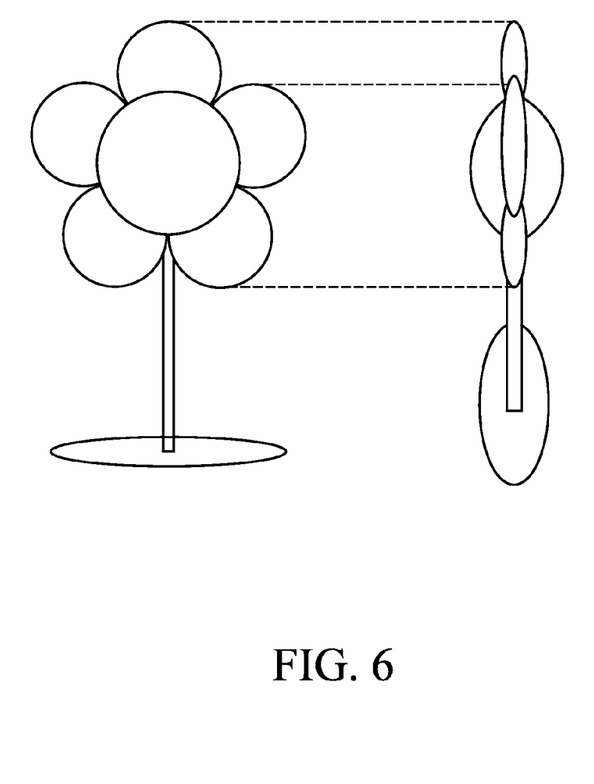
FIG. 6 is a front view of an acoustic sensor node that is shaped like a sunflower.
Figure 7:
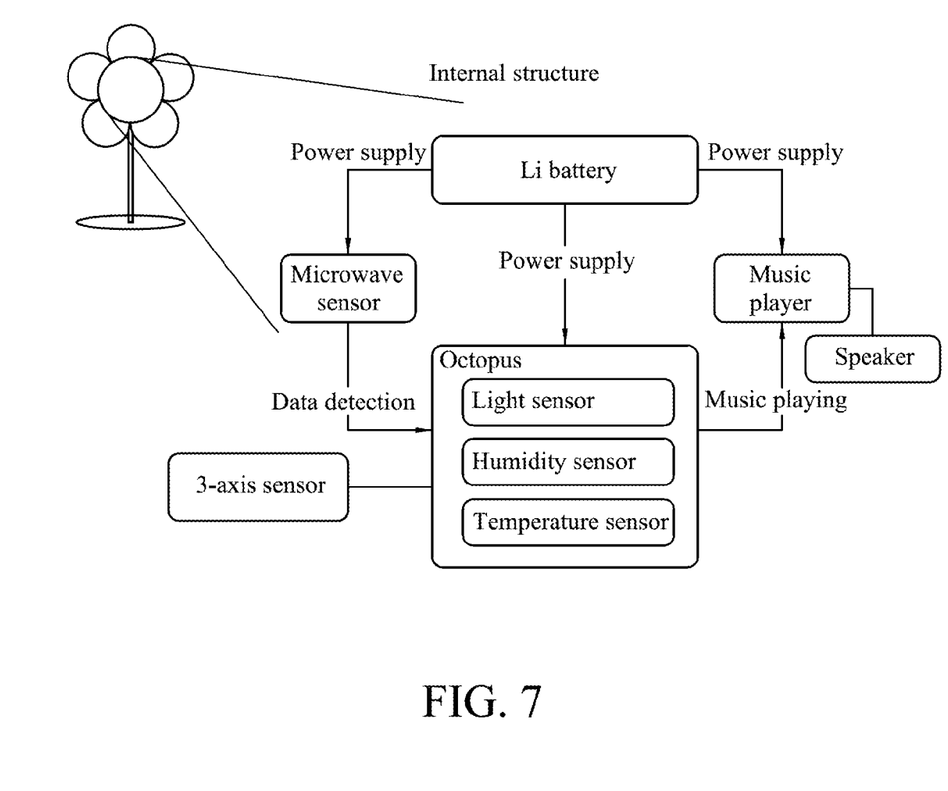
FIG. 7 shows the internal components that are configured inside a sunflower-shaped acoustic sensor node.

Please refer to FIG. 6 and FIG. 7, which are schematic diagrams showing an acoustic sensor node that is shaped like a sunflower according to an embodiment of the invention. As shown in FIG. 6 and FIG. 7, the acoustic sensor node comprises: an Octopus wireless sensor, a music module, a 3-axis sensor and a microwave sensor, which are all configured inside a sunflower-shaped art frame, and are powered by a portable lithium battery set or by power cord. Operationally, when a movement is detected by the microwave sensor, the microwave sensor will immediately transmit a detection signal to the Octopus sensor for enabling the same to control the music module to play music accordingly. Hence, the artistically-shaped acoustic sensor node is able to detect movements while enabling a music playing operation accordingly. Moreover, when the 3-axis sensor detect a condition of tapping or shaking, it will also transmit a detection signal to the Octopus sensor immediately for enabling the same to start an analysis upon the result of the detection; and if the analysis determines that the tapping or the shaking is minor, the Octopus sensor will issue a command for enabling the music module to start playing music. Hence, the artistically-shaped acoustic sensor node is able to detect and determine whether it is being tapped by users while enabling the music playing operation in response to the tapping.

To sum up, the present invention provides a artistically-shaped acoustic sensor node, which comprises: an artistically-shaped frame, capable of being shaped like a sunflower, but not limited thereby, so as to be provided for receiving sensing components and audio components therein; at least one sensor, each being a device selected from the group consisting of: a temperature sensor, a humidity sensor, a 3-axis accelerometer, a light sensor, a wind gauge, a rain gauge, etc.; and at least one lithium battery, to be used as power supply. With the aforesaid components, an interactive sound-and-light art device with wireless transmission and sensing functions can be constructed.

Moreover, each of the plural acoustic sensor nodes in artistic shapes further comprises: at least one component of synchronization combination tone, and each of the plural acoustic sensor nodes in artistic shapes further comprises: at least one component of ensemble music process.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims. Accordingly, the artistically-shaped frame is formed in a shape selected from the group consisting of: a puppet that is stationary, a puppet that is movable, an animal that is stationary, an animal that is movable, a plant that is stationary, and a plant that is movable.

As the Octopus II wireless sensor is working only under the ZigBee communication protocol which is different from the communication protocol that are commonly adopted by cellular phones, the Octopus II wireless sensor will not be able to interact with users through cellular phones. Thus, each of the plural acoustic sensor nodes in artistic shapes of the invention further comprises: at least one component of wireless gateway, which can be used a bridge between cellular phones and the acoustic sensor node, and by that a user is able download music playing in the acoustic sensor node into his/her cellular therethrough.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An interactive sound-and-light art system with wireless transmission and sensing functions, comprising:
    a plurality of acoustic sensor nodes in artistic shapes, whereas each of the plural acoustic sensor nodes is configured to provide input and stimulus to people through the detection of multi-track music playing or voice-based exhibition of social network conversations;
    wherein each acoustic sensor node comprises an artistically-shaped frame having a plurality of sensors embedded therein, comprising:
        sensors for detecting environmental information, comprising temperature sensors, humidity sensors, ambient light sensors, or wind sensors, wherein the interactive sound-and-light art system suspends operation based on the environmental information, and re-activates operation from where operation was suspended based on the environmental information; and
        sensors for detection of human motion, comprising 3-axis accelerometers or microwave sensors;
    wherein each artistically-shaped frame is further embedded with interactive components comprising music controllers, speakers, or light-emitting devices (LEDs) configuring each corresponding acoustic sensor node to provide input and stimulus to people through multi-track music playing or exhibition of LED light variations according to the detection of said environmental information and human motion information.

2. The interactive sound-and-light art system of claim 1, wherein each of the plurality of acoustic sensor nodes in artistic shapes further comprises:
    a seat, coupled to the artistically-shaped frame;
    a wireless sensor;
    a 3-axis sensor;
    a microwave sensor;
    at least one music module;
    at least one speaker; and
    at least one lithium battery, to be used as power supply;
    wherein, each acoustic sensor node is configured to detect the motion of an object and consequently play music accordingly when the microwave sensor detects a motion of the object, having the microwave sensor is configured to issue a signal to the wireless sensor for configuring the wireless sensor to issue a command for controlling the at least one music module to start a music playing operation;
    wherein, each acoustic sensor node is configured to detect the tapping from a foreign object and start the music playing operation when the 3-axis sensor detects a shake, having the 3-axis sensor is configured to issue a detection signal relating to the shake to the wireless sensor for enabling the wireless sensor to start an analysis operation upon the detection signal, and when the analysis of the wireless sensor shake determines that the shake is below a predetermined threshold, the wireless sensor is configured to issue a command for controlling the at least one music module to start a music playing operation.

3. The interactive sound-and-light art system of claim 1, wherein each of the plurality of acoustic sensor nodes in artistic shapes further comprises:
    at least one component providing a synchronization combination tone.

4. The interactive sound-and-light art system of claim 1, wherein each of the plurality of acoustic sensor nodes in artistic shapes further comprises:
    at least one component of an ensemble music process.

5. The interactive sound-and-light art system of claim 1, wherein each of the plural acoustic sensor nodes in artistic shapes further comprises:
    at least one component of a wireless gateway.

6. The interactive sound-and-light art system of claim 1, wherein the artistically-shaped frame is formed in a shape selected from the group consisting of: a puppet that is stationary, a puppet that is movable, an animal that is stationary, an animal that is movable, a plant that is stationary, and a plant that is movable.

* * * * *